April 8, 1930. J. G. JONES 1,754,205.
METHOD OF MAKING METAL SPOOLS
Filed April 28, 1926
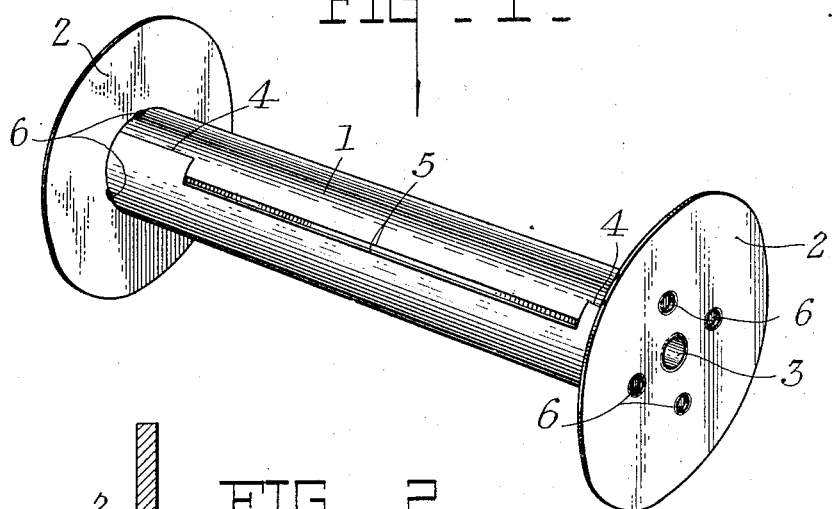
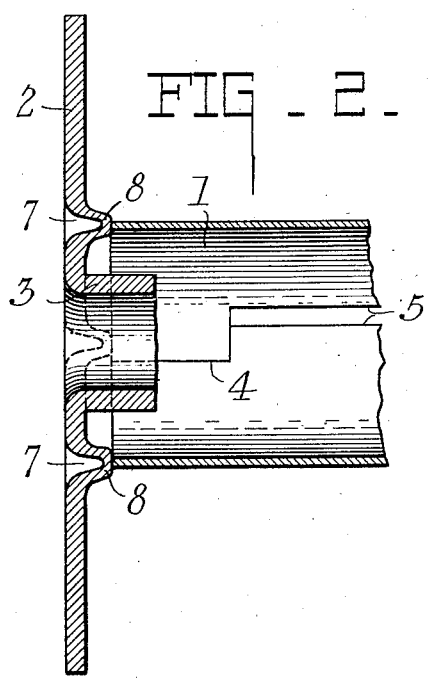
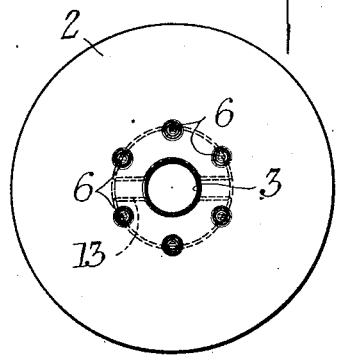
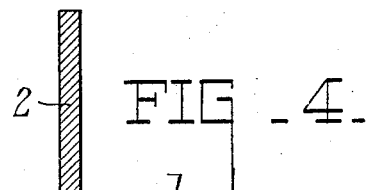
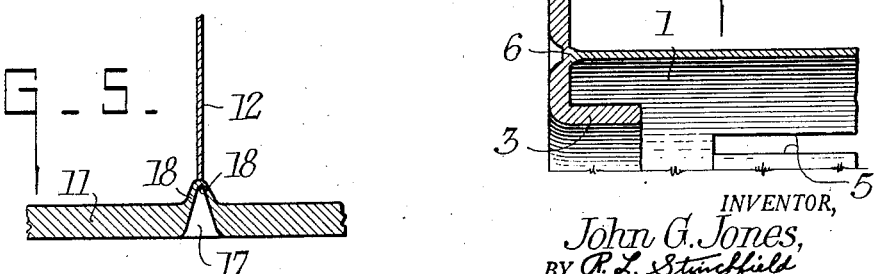
INVENTOR,
John G. Jones,
BY
ATTORNEYS.

Patented Apr. 8, 1930

1,754,205

UNITED STATES PATENT OFFICE

JOHN G. JONES, OF ROCHESTER, NEW YORK, ASSIGNOR TO EASTMAN KODAK COMPANY, OF ROCHESTER, NEW YORK, A CORPORATION OF NEW YORK

METHOD OF MAKING METAL SPOOLS

Application filed April 28, 1926. Serial No. 105,287.

This invention relates to welded sheet metal spools having parts of different thicknesses, such for instance as welded spools for use in photographic cartridges, and to methods which may be employed in making such spools.

One object of the invention is to provide a sheet metal spool having a core made from a metal of relatively thinner metal welded securely without harmful burning to flanges made of relatively thicker metal. Another object of the invention is to provide such a welded film spool in which the edges of the thin metal core are welded to spots of the thicker metal flanges, said spots being thinner than the rest of the flanges and sufficiently aproaching the thickness of the sheet metal of the core to avoid the presence of harmful amounts of oxidized metal at the spot welds. Still another object is to provide a metal spool for photographic film which will have the maximum lightness consistent with strength, accuracy and correct fitting in the spool chambers of standard film cameras,—in other words, will approach the lightness of the usual spools with wooden cores and yet have all the advantages of all metal welded spools. A further object is to provide a process in which sheet metal plates of different thicknesses can be electrically spot welded to unite an edge of the thinner one against a face of the thicker one without sufficiently burning the thinner to spoil the welds. Still another object is to utilize this process in welding the edges of a tubular spool core of relatively thin metal at right angles to the inner faces of relatively thicker metal flanges. A further object of the invention is to carry out such a process in the manufacture of welded sheet metal spools, so that the parts are united without harmful burning or oxidation in the joints, without distortion and so accurately that the dimensions will fall within the strict tolerances required in the photographic art. Other objects will hereinafter appear.

The usual spools employed in photographic film cartridges comprise a wooden hub to the ends of which are fastened flat circular metal flanges. These receive film strips and backing paper of established width and fit within spool chambers of standard compact roll film cameras. It has long been recognized that a spool composed entirely of sheet metal would have advantages over the usual wooden cored spool.

But if spools be prepared entirely from sheet metal of the same thickness as the flanges employed in the usual spools, the product is heavier than is desirable. The substitution of a tubular sheet metal hub or core in place of the wooden core of the usual spool is the chief item in the excess of weight. It is not desirable to lighten the spool by making the flanges of the all metal spool out of thinner sheets and then strengthen them by impressing ribs or corrugations in them. If this be attempted, there will be difficulties in making the film cartridges sufficiently light tight and they can not be fitted into the great number of standard film cameras now in use, while keeping the width of film and backing paper in the customary standard widths.

Granting, therefore, that the end flanges must be made of flat sheet metal of approximately the same gauge that they are in the usual spools, the only chance for lightening the product is to lighten the hub. If this is carried out by using metal for the hub which is thinner than the customary thickness of the flanges, difficulties in welding occur. From the standpoints of strength, speed and accuracy, it would be desirable to electrically spot weld the flanges to the cores of the thinner metal by forming projections on the flanges in the manner indicated in U. S. Patent, 877,398, Brinley, Jan. 21, 1908. But if these projections are merely struck-up so as to be of the same general thickness as the flanges, the spot welding operation causes burning of the contacting edges of the core with the consequent production of imperfect and weak welds. The manufacture of light weight sheet metal spools, especially for photographic film cartridges, therefore brings up the technical problem of properly welding hubs of thinner sheet metal edge-on to the thicker metal flanges and at the same time avoiding burning at the weld and inaccuracy in assembling. This is a special case of the general problem of spot welding an edge of a thinner sheet of metal to a face of a thicker sheet of metal.

I have solved both the special problem of making light sheet metal spools for photographic cartridges and the more general problem of spot welding an edge of thin sheet metal to a face of a thicker sheet, by providing the thicker metal sheet with struck-up welding spots which are so thin that they have electrical heating characteristics approximating those of the edges of the thinner metal sheet, when such edges are brought against them during the welding operation. In the manufacture of the film spools, the metal of the flanges is struck-up in spots, as indicated in the cited Brinley patent, except that the walls of the cup shaped projections are made thinner than the rest of the flanges,—in fact, the final thickness of the struck-up portions is brought approximately equal to the thickness of the sheet metal of the tubular hub. I have found that there is considerable latitude in the extent to which the thickness of the projections can vary from the thickness of the hub, but in all cases the thinning of these projections is sufficient to avoid injurious burning of the edges of the hub, when the latter are heated and welded electrically to said spots, the current and pressure being applied in the general manner indicated in said Brinley patent.

In Patent No. 1,616,973, of February 8, 1927 for automatic photographic film spool making machine, issued to H. G. Dewey and myself, there is shown an automatic machine for making and testing spot welded photographic film spools, and the machine of this patent is a preferred means of producing the spool to be hereinafter described.

Coming now to the drawings, wherein like reference characters denote like parts throughout:

Fig. 1 is a perspective view of a spool constructed in accordance with and illustrating a preferred embodiment of my invention;

Fig. 2 is a fragmentary section through the spool of Fig. 1 with the parts in position for welding, the parts being shown on an enlarged and an exaggerated scale;

Fig. 3 is an end elevation of a slightly different embodiment of my invention;

Fig. 4 is a fragmentary section of the parts shown in Fig. 2 after welding, and

Fig. 5 is a section through still another embodiment of my invention.

My invention broadly consists in welding an edge of a relatively thin plate to the face of a relatively thick plate by thinning areas of the thick plate and welding these areas to the thinner plate.

As a preferred embodiment of my invention, I have shown, in Figs. 1 to 4 inclusive, a typical film spool which may consist of a sheet metal hub of relatively light weight metal (say for instance .010″ to .015″ thick) joined to flanges 2 of relatively heavy metal (say .020″ to .025″ thick). The flanges 2 may be equipped with a central hole 3 in one end of the spool and a slot 13 in the other end such as are well known in the art.

The hub 1 may comprise a thin sheet of metal rolled and having abutting edges 4 and spaced edges 5, the latter edges forming a slot to receive the end of a film backing paper. The flanges 2 are fastened to the hub 1 by spot welds 6, preferably 4 or 6 being symmetrically arranged about the center of the flange. The number of welds will, of course, vary with the size and nature of the spool.

As shown in Fig. 2, the heavy metal flange 2 is formed at 7 with a tool so as to provide protuberances having walls 8 in the same order of thickness as the thickness of the hub member 1. These formings are concentric with the hub, and after the flange 2 is assembled as shown in Fig. 2, a welding heat is applied with pressure in any well known manner, causing the welds 6 to fuse as shown in Fig. 4. The walls thus joined being of substantially the same thickness causes the metal to form a good union without distortion, so that the dimensions of the complete spool may be accurately held. I prefer to simultaneously weld both flanges as shown in the copending application above referred to, but this is not essential.

Obviously my invention is applicable to joining plates other than those used for making photographic spools, and in Fig. 5, I have shown a heavy plate 11 to be welded to plate 12 of much thinner stock. Plate 11 is formed up at 17, so that the walls 18 may be relatively the same thickness as the plate 12 and these contacting walls may be welded by applying an electric current to raise the temperature of the contacting areas, which form resistances, to the necessary temperature for welding. As pressure is used, the resulting weld will be similar in cross section to the weld shown in Fig. 4.

Where, in the specification and claims, I refer to substantially the same thickness, it is to be understood that there may be a variation of about the same order of magnitude as the extreme measurements of commercial rolled sheet metal, that is .003″ or .004″ plus or minus, and where, in the claims I refer to a wall being of "a substantially reduced thickness" I mean a reduction of thickness of 30% or more. Of course, these figures will vary somewhat with the thickness of the stock.

Having thus described my invention, what I claim as new and desire to secure by Letters Patent is:

1. The process of welding two metal plates of different thickness of metal comprising forming a plurality of cup shaped projections on the heavier metal plate, the bottom wall of said cup shaped projections being of a substantially less thickness than that of the plate of which it is made, and electrically welding an edge of the lighter metal plate to the thin bottom walls of the cup shaped projections.

2. The process of uniting a relatively thin sheet of metal edge-on to one face of a relatively thicker sheet of metal, which comprises forming in said thicker sheet cup-shaped spaced spots projecting above said face along the line of weld, bringing an edge of said thinner sheet into contact with said spots, passing an electric current through said spots and the contacting edge of the thinner sheet to bring them to the welding condition and pressing said edge down on said spots while in such condition, the walls of said spots being thinner than the sheet from which they were formed to give said spots electric heating characteristics corresponding to those of the edge of said thinner sheet whereby overheating and burning of the latter are lessened.

3. The method of making film spools having a flange of one thickness of metal, and a core of metal of much thinner metal which consists in forming a plurality of protuberances on the flange member, each protuberance having a wall of substantially the same thickness as the core, and electrically welding the thin walled protuberances to the core.

4. The method of making film spools having flat disk-shaped flanges and a substantially cylindrical core, said flanges being made of metal of substantially twice the thickness of the core, which consists in forming a plurality of protuberances on the flanges, making the walls of said protuberances of substantially the same thickness as the metal of the core, and electrically welding the thin walled protuberances to the edge of the cylindrical core.

5. The method of making an all metal film spool having relatively heavy flanges with suitable openings therein for attachment to a camera, said spool having a relatively thin substantially cylindrical core, which consists in forming thin walled protuberances on the flanges in a pattern corresponding to the shape of the core end, the walls of each protuberance being substantially the same thickness as the metal of the core, and passing an electric current through the flanges while pressed into contact with the edges of the core, thus welding the parts together.

Signed at Rochester, New York, this 23rd day of April 1926.

JOHN G. JONES.